United States Patent
Reasoner et al.

(10) Patent No.: US 7,333,293 B2
(45) Date of Patent: Feb. 19, 2008

(54) STORAGE SYSTEM HAVING A READER WITH A LIGHT SENSING PORTION INCLINED WITH RESPECT TO AN AXIS OF A LABEL OF A STORAGE MEDIUM

(75) Inventors: Kelly J. Reasoner, Fort Collins, CO (US); Gregg S. Schmidtke, Fort Collins, CO (US); Thomas D. Benson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 411 days.

(21) Appl. No.: 10/880,312

(22) Filed: Jun. 29, 2004

(65) Prior Publication Data

US 2005/0286161 A1    Dec. 29, 2005

(51) Int. Cl.
*G11B 17/00*    (2006.01)
(52) U.S. Cl. .......................................................... 360/92
(58) Field of Classification Search ..................... None
See application file for complete search history.

(56) References Cited

U.S. PATENT DOCUMENTS

| | | | |
|---|---|---|---|
| 4,963,719 A | 10/1990 | Brooks et al. | |
| 5,323,327 A * | 6/1994 | Carmichael et al. | 700/215 |
| 5,457,308 A | 10/1995 | Spitz et al. | |
| 5,471,561 A * | 11/1995 | Cowgill et al. | 700/247 |
| 5,481,103 A | 1/1996 | Wang | |
| 5,495,097 A | 2/1996 | Katz et al. | |
| 5,581,522 A * | 12/1996 | Sibuya et al. | 360/92 |
| 5,710,419 A | 1/1998 | Wang et al. | |
| 5,821,519 A | 10/1998 | Lee et al. | |
| 6,032,863 A | 3/2000 | Nethery, III | |
| 6,205,093 B1 * | 3/2001 | Abbott et al. | 369/30.31 |
| 6,552,866 B1 * | 4/2003 | Lechner | 360/69 |
| 6,631,102 B2 | 10/2003 | Gardner, Jr. et al. | |
| 6,634,553 B2 | 10/2003 | Reasoner et al. | |
| 6,663,003 B2 | 12/2003 | Johnson et al. | |
| 6,693,858 B2 | 2/2004 | Reasoner et al. | |
| 6,715,031 B2 | 3/2004 | Camble et al. | |
| 2003/0126309 A1 | 7/2003 | Camble et al. | |
| 2003/0126395 A1 | 7/2003 | Camble et al. | |
| 2003/0187987 A1 | 10/2003 | Messick et al. | |
| 2003/0200247 A1 | 10/2003 | Benzhaf et al. | |
| 2003/0218943 A1 | 11/2003 | Gardner, Jr. et al. | |
| 2004/0078632 A1 | 4/2004 | Infante et al. | |

* cited by examiner

*Primary Examiner*—A. J. Heinz
*Assistant Examiner*—Mark Blouin

(57) ABSTRACT

A storage system includes at least one storage medium having a label, the label having a width extending along a first axis. The tape storage system further includes a reader to read the label based on light scanned across the label, where the reader has a light sensing portion extending along a second axis that is inclined with respect to the first axis.

23 Claims, 2 Drawing Sheets

STORAGE SYSTEM HAVING A READER WITH A LIGHT SENSING PORTION INCLINED WITH RESPECT TO AN AXIS OF A LABEL OF A STORAGE MEDIUM

BACKGROUND

Tape storage systems are typically used to store backup data of one or more computer systems. A tape storage system can be connected directly to a computer system, or the tape storage system can be part of a storage area network accessible by a plurality of computer systems.

A tape storage system typically includes multiple tape cartridges that are selectively picked for loading into a tape drive of the tape storage system. The picking of a tape cartridge is accomplished by use of a picker assembly (also referred to as a robot). In some tape storage systems, the tape cartridges are arranged on a movable platform, such as a conveyor platform, to allow the tape cartridges to move relative to the picker assembly. Once a desired one of the tape cartridges is moved proximal the picker assembly, the tape cartridge is grabbed by the picker assembly. The picker assembly then rotates to a position to enable the loading of the picked tape cartridge into a tape drive.

A picker assembly usually selects a tape cartridge in the tape storage system by reading labels on the tape cartridges. In one implementation, each label contains a bar code. The picker assembly includes a reader, such as a bar code reader, to read the label of each tape cartridge. The bar code reader receives light reflected from the bar code of a tape cartridge to determine the identifier of the tape cartridge. Conventionally, the bar code reader reads the bar code along a direction that is perpendicular to the bars of the bar code. In other words, the bar code reader receives light reflected from the bar code along a direction that is parallel to an axis defined along the width of the bar code.

If the bar code reader and tape cartridge label are moveable with respect to each other only along the axis defined along the width of the bar code, then the bar code reader may not be able to read a different part of the bar code in case a first read fails. A bar code reader may thus not be able to successfully read a bar code if there is some irregularity on the bar code, such as due to a portion of the bar code being removed or damaged, that prevents the bar code reader from reading the entire bar code. The inability to read a bar code may lead to errors in accessing data stored in a tape storage system.

DETAILED DESCRIPTION

Figure 1:
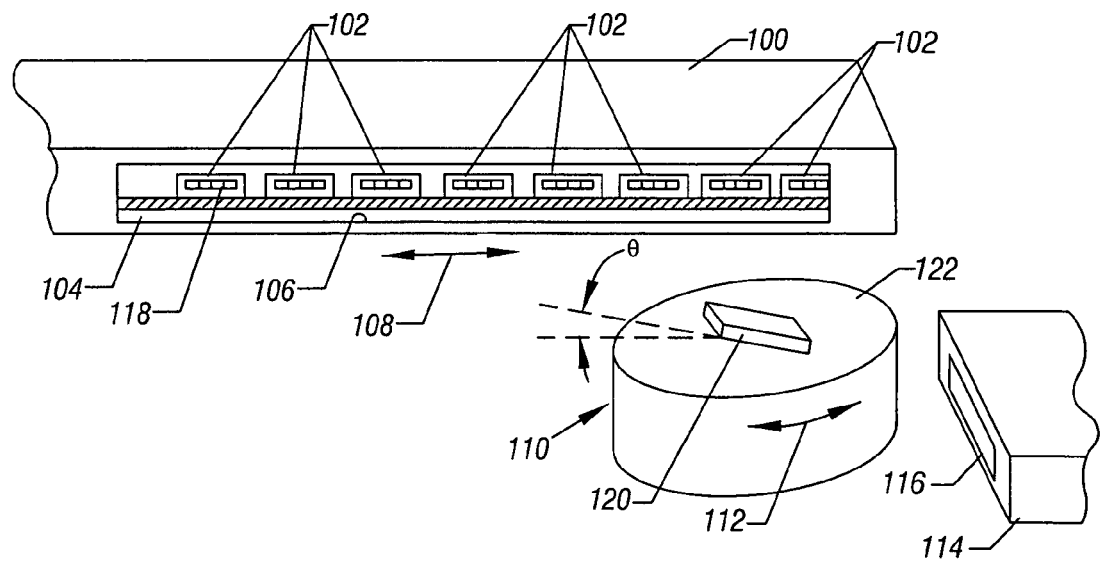
FIG. 1 illustrates a portion of a tape storage system that incorporates an embodiment of the invention.

FIG. 1 illustrates components within a tape storage system, in accordance with an embodiment. The tape storage system of FIG. 1 includes a magazine 100 that stores multiple tape cartridges 102. As used here, a "magazine" refers to an apparatus for holding one or plural tape cartridges, and "tape cartridge" refers to either a single-reel tape cartridge or a two-reel tape cassette or any other apparatus that contains a tape storage medium. Although only one magazine 100 is depicted in FIG. 1, a tape storage system can include one or more additional magazines for holding additional tape cartridges 102.

Although reference is made to reading labels of tape cartridges in the described embodiments, it is noted that techniques and mechanisms described herein can also be applied to other storage systems that contain other types of storage media each with a label that is read for purposes of identification. Examples of other types of storage media include compact disks (CDs), digital video disks (DVDs), magneto-optical media, ultra-density optical media, and so forth.

The magazine 100 has an opening 106 to allow access to the tape cartridges 102. The tape cartridges 102 are arranged on a movable platform 104. The platform 104 is movable generally along a horizontal axis indicated by the reference numeral 108.

The tape storage system also includes a picker assembly 110 that is able to pick one of the tape cartridges 102. The picker assembly 110 grabs a selected one of the tape cartridges 102 and rotates in a direction indicated by arrow 112 to a position to load the picked tape cartridge into a tape drive 114. The tape drive 114 has a receptacle 116 to receive the tape cartridge 102 from the picker assembly 110.

If additional magazines 100 are contained in the tape storage system, the picker assembly 110 is rotatable to other positions to retrieve tape cartridges from such other magazines.

In the exemplary implementation shown in FIG. 1, the tape cartridges 102 are movable by the movable platform 104 in the magazine 100 along the horizontal axis 108, while the picker assembly 110 is stationary along the horizontal axis 108. However, in other embodiments, the picker assembly 110 can be movable with respect to stationary tape cartridges. In yet another embodiment, instead of a single row of tape cartridges in a magazine as depicted in FIG. 1, tape cartridges can also be stacked in the vertical direction (to provide multiple columns of tape cartridges) in a magazine to enable a greater density of tape cartridges in the tape storage system. In such an arrangement, the picker assembly 110 and tape cartridges 102 are moveable with respect to each other along two different dimensions to enable the picker assembly 110 to pick selected tape cartridges.

Each tape cartridge 102 has a label 118 (or other type of indicia) that contains an identifier of a tape cartridge. As used here, the term "label" refers to any device or indicator that is provided for identifying the tape cartridge. In response to a request received by the tape storage system, the picker assembly 110 is instructed to read the labels 118 of the tape cartridges 102 until the requested tape cartridge is identified. Once identified, the picker assembly 110 is instructed to withdraw the tape cartridge 102 from the storage magazine 100, and to load the picked tape cartridge 102 into the tape drive 114 to perform a tape storage access operation (such as a read or write operation).

To read the label 118 on a tape cartridge 102, the picker assembly 110 includes a reader 120. In one embodiment, the label 118 contains a bar code, and the reader 120 is a bar code reader. In other embodiments, the label 118 contains other types of identifiers (e.g., text-based identifiers), and other types of readers are used. To read a label 118, light is scanned across the label 118, with the light reflected from the label 118 received by the reader 120. The light scanned across the label 118 can be produced by a light source within the reader 120, or by a light source positioned elsewhere on the picker assembly 110 or elsewhere in the tape storage system.

Figure 2:
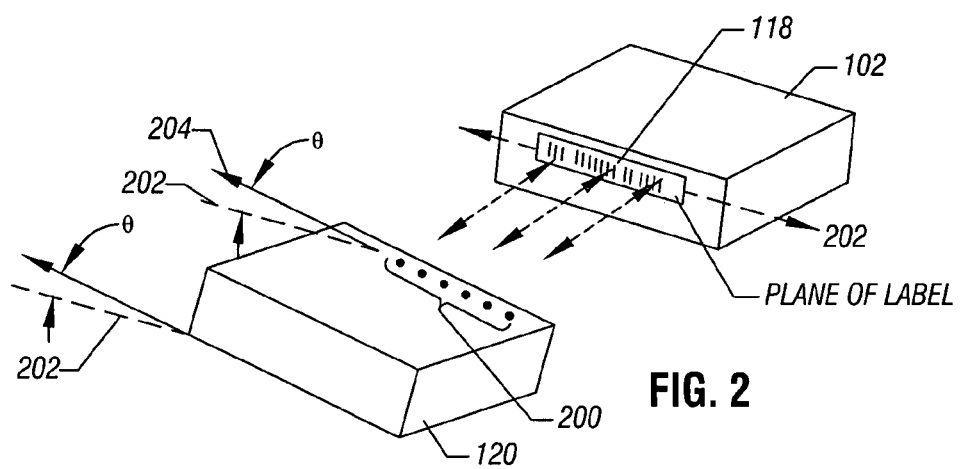
FIG. 2 illustrates a reader positioned with respect to a tape cartridge in the tape storage system of FIG. 1, where a light sensing portion of the reader is positioned to receive light at an angle from an axis of a label on the tape cartridge, in accordance with an embodiment.

As depicted in FIG. 1, a surface 122 of the picker assembly 110 lies generally in a horizontal plane that is parallel to the horizontal axis 108. The reader 120 has a light sensing portion 200 (FIG. 2) that is inclined at an angle θ with respect to the horizontal plane of the picker assembly surface 122. The inclined light sensing portion 200 of the reader 120 is arranged to receive light reflected from each label 118 of a respective tape cartridge 102, where the received light extends along a direction that is generally inclined with respect to the horizontal axis of the label 118 of the tape cartridge 102. In the arrangement depicted in FIG. 1, the horizontal axis of the label 118 is parallel to the horizontal axis 108. The horizontal axis of the label 118 (which extends along the width of the label and extends in a plane of a surface of the label as indicated in FIG. 2) is identified by reference numeral 202 in FIG. 2. In a different arrangement, instead of inclining the light sensing portion 200 with respect to the axis along the width of the label 118, the light sensing portion 200 can be inclined with respect to an axis along a height of the label 118.

In one embodiment, the inclined arrangement of the light sensing portion 200 (FIG. 2) is provided by inclining the entire reader 120 with respect to the picker assembly surface 122. In an alternative embodiment, instead of the entire reader 120 being inclined at the angle θ with respect to the surface 122, the reader 120 can be arranged to be generally parallel to the picker assembly surface 122 while the light sensing portion 200 (FIG. 2) in the reader 120 is arranged at the angle θ with respect to the picker assembly surface 122.

In one implementation, the light sensing portion 200 of the reader 120 is a charge-coupled device (CCD). As depicted in FIG. 2, the light sensing elements of the light sensing portion 200 extend along an axis 204 that has an angle θ with respect to the horizontal axis 202 of the label 118. As noted above, the angle θ can be provided by inclining the entire reader 120, or by inclining just the light sensing elements.

In a different embodiment, the light sensing portion 200 can include elements to detect laser reflected from the label 118. Thus, as used here, the term "light" refers to any type of light or electromagnetic radiation that is emitted from a light source such as light emitting diodes (LEDs), laser sources, and so forth. Although not shown in FIG. 2, the light sensing portion 200 can also include an assembly of one or more lenses to focus light reflected from the label 118.

A benefit of inclining the light sensing portion 200 with respect to the horizontal axis 202 of the label 118 is that as the tape cartridge 102 and reader 120 are moved with respect to each other (either due to movement of the reader 120 or movement of the tape cartridge 102, or both), the reader 120 is able to read different portions of the label 118. Note that the ability to read different portions of the label 118 exists even though the reader 120 and tape cartridges 102 are moveable with respect to each other only along one dimension (that is parallel to the axis 108 depicted in FIG. 1). The ability to read different portions of the label 118 enhances the likelihood that the reader 120 will be able to successfully read the label 118, even if one portion of the label 118 is damaged, removed, or otherwise un-readable.

Figure 3A:
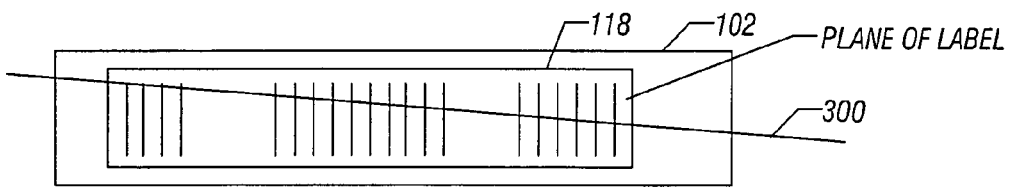
FIGS. 3A-3C illustrate inclined reading of a label on a tape cartridge in accordance with an embodiment.
Figure 3B:
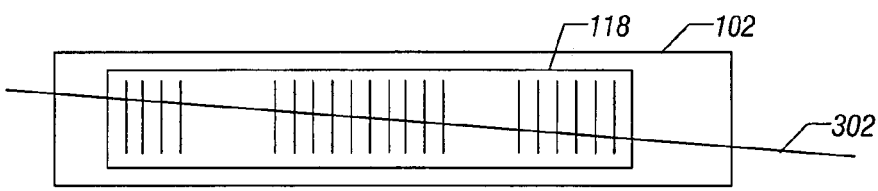
Figure 3C:
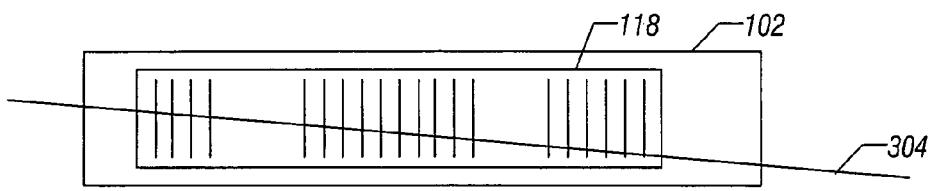

FIGS. 3A-3C illustrate portions of the label 118 that are read as the tape cartridge 102 moves from a left to right direction. FIG. 3A is the leftmost position of the tape cartridge 102 with respect to the reader 120 (FIG. 2), whereas FIG. 3C is a rightmost position of the tape cartridge 102 with respect to the reader 120. At the position of FIG. 3A, the light sensing portion 200 (FIG. 2) of the reader receives light reflected from a first portion of the label 118, indicated by line 300. Note that line 300 crosses the upper left corner of the label 118. Line 300 is also inclined at the angle θ respect to the horizontal axis 202 (FIG. 2) of the label 118.

As the tape cartridge 102 moves (along axis 108 of FIG. 1) to a position that is to the right of the FIG. 3A position, a second portion of the label 118, indicated by line 302 (FIG. 3B), is detected by the reader 120. Note that the line 302 has moved slightly downwardly from the position of line 300 (even though the relative motion of the tape cartridge 102 and reader 120 is along axis 108 of FIG. 1). Line 302 is also inclined at the angle θ with respect to the horizontal axis 202 (FIG. 2) of the label 118.

As the tape cartridge moves further to the right, as shown in FIG. 3C, a third portion of the label 118, indicated by line 304, is read by the reader 120. The line 304 is further down than line 302 of FIG. 3B. The line 304 is also inclined at the angle θ with respect to the horizontal axis 202 (FIG. 2) of the label 118.

In this manner, the reader 120 is able to read different portions (indicated by lines 300, 302, and 304) of the label 118 in response to relative motion of the reader 120 and tape cartridge 102 along a horizontal direction. As a result, the likelihood that the reader is able to scan a valid portion of the label 118 is enhanced, which decreases the occurrence of errors during reading of labels 118 of tape cartridges 102.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A storage system comprising:
   at least one storage medium having a label; and
   a reader to read the label based on light scanned across the label, the label having a width extending along a first axis, wherein the first axis extends in a plane of a surface of the label,
   wherein the reader has a light sensing portion extending in a direction parallel to a second axis that is inclined in the plane with respect to the first axis.

2. The storage system of claim 1, further comprising additional storage media each having a label with a width extending along the first axis, the storage media and the reader being moveable with respect to each other to enable the reader to read the label of each of the storage media.

3. The storage system of claim 2, wherein the light sensing portion of the reader extends in a direction that is parallel to an axis that is inclined in the plane with respect to the first axis of the label of each storage medium.

4. The storage system of claim 2, wherein the storage media comprise tape cartridges, and each label contains a bar code.

5. A tape storage system comprising:
   at least one tape cartridge having a label; and
   a reader to read the label based on light emitted onto the label, the label having a width extending along a first axis in a plane of a surface of the label, wherein the reader has a light sensing portion to receive light reflected from the label, wherein the light sensing portion comprises a plurality of light sensing elements extending along a direction parallel to a second axis that is inclined in the plane with respect to the first axis.

6. The tape storage system of claim 5, further comprising a movable platform, the at least one tape cartridge being provided on the movable platform.

7. The tape storage system of claim 6, further comprising additional tape cartridges mounted on the movable platform, each of the additional tape cartridges having a label, the movable platform to move the tape cartridges generally along a direction parallel to the first axis, the light sensing portion to receive light reflected from each of the labels along the second axis that is inclined with respect to the first axis.

8. The tape storage system of claim 5, wherein the label of each tape cartridge contains a bar code, and the reader comprises a bar code reader.

9. The tape storage system of claim 8, wherein each of the bar codes has a plurality of bars, and the reader comprises a bar code reader, the light sensing portion of the bar code reader to receive light reflected from the bar code along the second axis that is inclined with respect to an axis that is perpendicular to the bars of the bar code.

10. The tape storage system of claim 5, further comprising additional tape cartridges, wherein the reader and tape cartridges are movable with respect to each other to enable the reader to read the label of each of the tape cartridges based on light scanned across the label of each tape cartridge, the light sensing portion of the reader being inclined with respect to the first axis of the label of each tape cartridge.

11. The storage system of claim 1, wherein the light sensing portion extending along the direction parallel to the second axis enables the light sensing portion to receive light reflected from a portion of the label that is parallel to the second axis in the plane.

12. A tape storage system comprising:
at least one tape cartridge having a label; and
a reader to read the label based on light emitted onto the label, the label having a width extending along a first axis,
wherein the reader has a light sensing portion, the light sensing portion to receive light reflected from the label along a direction parallel to a second axis that is inclined with respect to the first axis,
wherein the at least one tape cartridge is moveable with respect to the reader,
wherein the light sensing portion is adapted to receive reflected light from a first portion of the label in response to a first relative position of the tape cartridge and reader, the first portion extending along an axis parallel to the second axis, and
wherein the light sensing portion is adapted to receive reflected light from a second, different portion of the label in response to a second relative position of the tape cartridge and reader, the second portion extending along an axis parallel to the second axis.

13. The tape storage system of claim 5, further comprising a tape drive, a magazine for storing the tape cartridge, and a picker assembly, the picker assembly to withdraw the tape cartridge from the magazine to load in the tape drive, the reader mounted on the picker assembly.

14. The tape storage system of claim 13, further comprising additional tape cartridges each with a label, the additional tape cartridges stored in the magazine, wherein the picker assembly is adapted to withdraw the tape cartridges from the magazine,
the light sensing portion to receive light reflected from each of the labels along the second axis that is inclined with respect to the first axis.

15. The tape storage system of claim 12, wherein the first axis is in a plane of a surface of the label, and the second axis is inclined with respect to the first axis in the plane.

16. A method of reading a label on a tape cartridge, comprising:
providing a light sensing portion of a reader, wherein the light sensing portion has a width extending along a direction that is at an incline with respect to a first axis of the label on the tape cartridge, the first axis extending along a height of the label in a plane of a surface of the label, wherein the direction in which the light sensing portion extends is parallel to a second axis inclined with respect to the first axis in the plane;
moving the tape cartridge with respect to the reader; and
reading different portions of the label as the tape cartridge is moved relative to the reader.

17. The method of claim 16, wherein moving the tape cartridge relative to the reader comprises moving the tape cartridge on a movable platform in the tape storage system.

18. The method of claim 16, wherein moving the tape cartridge relative to the reader comprises moving the reader in the tape storage system.

19. The method of claim 16, wherein the tape storage system has multiple tape cartridges, each of the tape cartridges having a label, the method further comprising:
moving the tape cartridges relative to the reader; and
reading different portions along a second axis of the label of each tape cartridge as each tape cartridge moves relative to the reader.

20. The method of claim 16, further comprising:
scanning light across the label; and
receiving reflected light from the label at the light sensing portion.

21. The method of claim 16, wherein the tape storage system comprises a picker assembly and a magazine storing the tape cartridge, the method further comprising:
removing the tape cartridge from the magazine by the picker assembly.

22. The method of claim 16, wherein moving the tape cartridge with respect to the reader comprises moving the tape cartridge with respect to the reader along a direction that is parallel to the first axis.

23. The method of claim 16, wherein the light sensing portion extending along the direction parallel to the second axis enables the light sensing portion to receive light reflected from a portion of the label that is parallel to the second axis in the plane.

* * * * *

UNITED STATES PATENT AND TRADEMARK OFFICE
CERTIFICATE OF CORRECTION

| | |
|---|---|
| PATENT NO. | : 7,333,293 B2 |
| APPLICATION NO. | : 10/880312 |
| DATED | : February 19, 2008 |
| INVENTOR(S) | : Kelly J. Reasoner et al. |

Page 1 of 1

It is certified that error appears in the above-identified patent and that said Letters Patent is hereby corrected as shown below:

In column 3, line 36, after "204" insert -- (direction) --.

In column 3, line 38, after "118." insert -- In other words, the axis 204 is parallel to an axis (e.g., axis along line 300, 302, or 304 in Figs. 3A-3C) in the plane of the label 118, which is inclined at the angle θ in the plane of the label with respect to the axis 202. --.

Signed and Sealed this

Twenty-ninth Day of July, 2008

JON W. DUDAS
*Director of the United States Patent and Trademark Office*